United States Patent
Shi et al.

(10) Patent No.: US 10,923,762 B2
(45) Date of Patent: Feb. 16, 2021

(54) LITHIUM-ION BATTERY

(71) Applicant: SHENZHEN CAPCHEM TECHNOLOGY CO., LTD., Guangdong (CN)

(72) Inventors: Qiao Shi, Guangdong (CN); Shiguang Hu, Guangdong (CN); Xionggui Lin, Guangdong (CN); Jiaojiao Yun, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 122 days.

(21) Appl. No.: 16/316,618

(22) PCT Filed: Dec. 29, 2016

(86) PCT No.: PCT/CN2016/113032
§ 371 (c)(1),
(2) Date: Jan. 9, 2019

(87) PCT Pub. No.: WO2018/094819
PCT Pub. Date: May 31, 2018

(65) Prior Publication Data
US 2019/0305365 A1 Oct. 3, 2019

(30) Foreign Application Priority Data
Nov. 25, 2016 (CN) .......................... 2016 1 1055609

(51) Int. Cl.
| | |
|---|---|
| *H01M 10/0525* | (2010.01) |
| *H01M 10/0567* | (2010.01) |
| *H01M 4/525* | (2010.01) |
| *H01M 4/38* | (2006.01) |
| *H01M 4/587* | (2010.01) |
| *H01M 4/36* | (2006.01) |

(52) U.S. Cl.
CPC ....... *H01M 10/0525* (2013.01); *H01M 4/366* (2013.01); *H01M 4/386* (2013.01); *H01M 4/525* (2013.01); *H01M 4/587* (2013.01); *H01M 10/0567* (2013.01); *H01M 2300/0025* (2013.01)

(58) Field of Classification Search
CPC .. H01M 10/0525; H01M 4/366; H01M 4/386; H01M 4/525; H01M 4/587; H01M 10/0567; H01M 2300/0025; H01M 4/62
See application file for complete search history.

(56) References Cited

U.S. PATENT DOCUMENTS

| | | | |
|---|---|---|---|
| 2009/0087362 A1* | 4/2009 | Sun | ........................ C01G 53/42 423/179.5 |
| 2013/0323605 A1* | 12/2013 | Yamamoto | ........ H01M 10/0525 429/332 |
| 2018/0048031 A1* | 2/2018 | Tang | ..................... H01M 10/02 |
| 2020/0168908 A1* | 5/2020 | Kim | .................. H01M 10/0525 |

FOREIGN PATENT DOCUMENTS

| | | |
|---|---|---|
| CN | 1558464 A | 12/2004 |
| CN | 1627550 A | 6/2005 |
| CN | 102150315 A | 8/2011 |
| CN | 103151559 A | 6/2013 |
| CN | 104300174 | 1/2015 |
| JP | 2012084384 A | 4/2012 |

OTHER PUBLICATIONS

International Search Report of PCT Patent Application No. PCT/CN2016/113032 dated Aug. 25, 2017.

* cited by examiner

*Primary Examiner* — Muhammad S Siddiquee

(57) ABSTRACT

A lithium-ion battery, comprising a cathode, an anode, and a non-aqueous electrolyte; the cathode comprises a cathode active material and a metal oxide and/or metal fluoride coating which covers the surface of the cathode active material; the cathode active material is at least one of materials illustrated in general formula I or II: formula I: $Li_xNi_yM_{1-y}O_2$, wherein $0.5 \leq x \leq 1.2$, $0.5 \leq y \leq 1$, and M is selected from at least one of Co, Mn, Al, Ti, Fe, Zn, Zr, Cr, and formula II: $Li_kCo_zL_{1-z}O_2$, wherein $0.5 \leq k \leq 1.2$, $0.5 < z \leq 1$, and L is selected from at least one of Ni, Mn, Al, Ti, Fe, Zn, Zr, Cr. According to the lithium-ion battery, the charge cut-off voltage of the lithium-ion battery reaches 4.3 V or more by means of a synergistic effect of the unsaturated phosphate compounds and the coating at the surface of the cathode active material.

10 Claims, No Drawings

LITHIUM-ION BATTERY

TECHNICAL FIELD

The present application relates to the field of lithium-ion batteries, and in particular to a high-voltage lithium-ion battery.

BACKGROUND OF THE INVENTION

Lithium-ion batteries have the advantages of light weight, small size, high operating voltage, high energy density, large output power, no memory effect and long cycling life, among others, and therefore have been widely used in digital products such as mobile phones and laptops, and are also considered to be one of the best choices for electric vehicles and large energy storage devices. At present, electronic digital products such as smart phones and tablet computers have increased requirement for energy density of batteries, making it difficult for commercially-available lithium-ion batteries to meet the requirement.

When lithium-ion batteries are in high-temperature charge-discharge cycling or high-temperature storage, the decomposition of the electrolyte on the surface of the cathode material will be more serious. The oxidative decomposition products of the electrolyte increasingly deposit on the surface of the cathode, resulting in an increase in the impedance of the cathode surface that leads to deterioration of battery performances. Especially, when the nickel content in the cathode material is high, the surface activity of the cathode material is higher, and the decomposition of the electrolyte is more serious. In addition, increasing the charging voltage of lithium-ion batteries further increases the dissolution of the metal ions of the cathode material, and the dissolved metal ions not only catalyze the decomposition of the electrolyte but also destroy the passivation film on the anode. Especially, during long-term high-temperature storage or high-temperature cycling, the dissolution of the metal ions of the cathode is more serious, resulting in rapid deterioration of battery performances.

Coating the cathode active material with inorganic particles is a common method for improving the high-temperature performance of high-voltage batteries, but while the improvement is effective, the extent of improvement needs to be further increased. In addition, Patent Document CN201410534841.0 discloses an additive of phosphate ester compound containing a triple bond, which can significantly improve the high-temperature performance of batteries. However, the present inventors have found that the phosphate ester compound containing a triple bond significantly lowers the low-temperature discharge performance of batteries.

SUMMARY OF THE INVENTION

An object of the present application is to provide a novel high-voltage lithium-ion battery, especially a high-voltage lithium-ion battery having a charging voltage of higher than 4.3V.

In order to achieve the above object, the present application adopts the following technical solutions:

A lithium-ion battery, comprising a battery case, and a cathode, an anode and a non-aqueous electrolyte inside the battery case; the cathode comprising a cathode active material and a coating layer coated on a surface of the cathode active material; the cathode active material having at least one of the component represented by general formula 1 or general formula 2, $$Li_xNi_yM_{1-y}O_2, \quad \text{general formula 1:}$$

wherein $0.5 \leq x \leq 1.2$, $0.5 \leq y \leq 1$, and M is at least one selected from the group consisting of Co, Mn, Al, Ti, Fe, Zn, Zr, and Cr;

$$Li_kCo_zL_{1-z}O_2, \quad \text{general formula 2:}$$

wherein $0.5 \leq k \leq 1.2$, $0.5 < z \leq 1$, L is at least one selected from the group consisting of Ni, Mn, Al, Ti, Fe, Zn, Zr, and Cr;

the coating layer is a metal oxide and/or a metal fluoride;

the anode includes an anode active material selected from at least one of graphite or a silicon-containing carbon material;

the non-aqueous electrolyte contains at least one of the unsaturated phosphate ester compounds represented by structural formula 1,

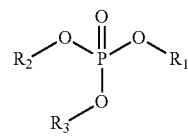

structural formula 1 wherein $R_1$, $R_2$ and $R_3$ are each independently selected from a saturated hydrocarbon group, an unsaturated hydrocarbon group or a halogenated hydrocarbon group having 1 to 5 carbon atoms, and at least one of $R_1$, $R_2$ and $R_3$ is an unsaturated hydrocarbon group.

In the above general formula 1, preferably $0.8 \leq x \leq 1.1$, for example, x can be 0.8, 0.9, 1.0, or 1.1. In the general formula 1, preferably $0.8 \leq y \leq 1$, for example, y can be 0.8, 0.9, or 1.0.

In the present invention, the cathode active material having the composition shown in general formula 1 can be one of $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$, $LiNi_{0.8}Co_{0.2}O_2$, or $LiNi_{0.8}Co_{0.15}Al_{0.05}O_2$.

In the above general formula 2, preferably $0.8 \leq k \leq 1.1$, for example, k can be 0.8, 0.9, 1.0, or 1.1. In the general formula 2, preferably $0.8 \leq z \leq 1$, for example, z can be 0.8, 0.9, or 1.0.

In the present invention, the cathode active material having the composition shown in general formula 2 can be $LiCoO_2$.

The material of the coating layer is a metal oxide and/or a metal fluoride, and specifically, the material can be an oxide or fluoride of at least one of Zn, Mg, Al, Zr, Cr, Ti, Ag, Nb, Y, Sr, W, Mo, Pb, Cd, Ca, Ba, or Sn.

Preferably, the material of the coating layer is at least one selected from the group consisting of ZnO, MgO, $Al_2O_3$, $ZrO_2$, $Cr_2O_3$, $AlF_3$, or $TiO_2$.

Preferably, the content of the coating layer is 0.5 to 3% based on the total weight of the cathode active material and the coating layer.

The coating layer formed on the surface of the cathode active material can be prepared by a conventional method, for example, by mixing a lithium compound with a compound containing Ni and containing M and heat-treating the mixture obtained to prepare a compound represented by general formula 1, or by mixing a lithium compound with a compound containing Co and/or containing L and heat-treating the mixture obtained to prepare a compound represented by general formula 2;

The compound represented by general formula 1 or the compound represented by general formula 2 is mixed evenly with an aqueous solution comprising at least one metal element selected from the group consisting of Zn, Mg, Al, Zr, Cr, Ti, Ag, Nb, Y, Sr, W, Mo, Pb, Cd, Ca, Ba, or Sn, and the mixture obtained is heat treated to surface-coat the compound represented by general formula 1 or the compound represented by general formula 2.

For the above unsaturated phosphate ester compound, preferably, in structural formula 1, the saturated hydrocarbon group is one selected from the group consisting of methyl, ethyl, propyl, isopropyl, or butyl; the unsaturated hydrocarbon group is one selected from the group consisting of vinyl, allyl, 3-butenyl, isobutenyl, 4-pentenyl, ethynyl, propargyl, 3-butynyl, or 1-methyl-2-propynyl; and the halogenated hydrocarbon group is one selected from the group consisting of monofluoromethyl, difluoromethyl, trifluoromethyl, 2,2,2-trifluoroethyl, 2,2-difluoroethyl, 2,2,2-trifluoroethyl, 3,3-difluoropropyl, 3,3,3-trifluoropropyl, or hexafluoroisopropyl.

Preferably, the unsaturated phosphate ester compound is specifically one or more selected from the group consisting of tripropargyl phosphate, dipropargyl methyl phosphate, dipropargyl ethyl phosphate, dipropargyl propyl phosphate, dipropargyl trifluoromethyl phosphate, dipropargyl 2,2,2-trifluoroethyl phosphate, dipropargyl 3,3,3-trifluoropropyl phosphate, dipropargyl hexafluoroisopropyl phosphate, triallyl phosphate, diallyl methyl phosphate, diallyl ethyl phosphate, diallylpropyl phosphate, diallyl trifluoromethyl phosphate, diallyl 2,2,2-trifluoroethyl phosphate, diallyl 3,3,3-trifluoropropyl phosphate, or diallyl hexafluoroisopropyl phosphate.

Preferably, in the non-aqueous electrolyte, the content of the unsaturated phosphate ester compound is from 0.1% to 5%. When the amount is less than 0.1%, the effect of forming a passivation film on the surface of the cathode and the anode is deteriorated, and the effect of improving high-temperature performance is lowered. When the amount is more than 5%, as the passivation film formed on the surface of the cathode active material and the anode active material is too thick, the internal resistance of the battery is increased, and the low-temperature discharge and the rate performance of the battery are lowered. More preferably, the content of the unsaturated phosphate ester compound is 0.1 to 3%.

Those skilled in the art appreciate that the non-aqueous electrolyte generally includes a non-aqueous organic solvent. In the present invention, preferably, the non-aqueous organic solvent is one or more selected from the group consisting of ethylene carbonate, propylene carbonate, butylene carbonate, dimethyl carbonate, diethyl carbonate, ethyl methyl carbonate, or methyl propyl carbonate; and preferably, non-aqueous organic solvent contains ethylene carbonate, diethyl carbonate, and ethyl methyl carbonate at the same time. The non-aqueous organic solvent is a main component of the non-aqueous electrolyte, and the weight ratio thereof in the non-aqueous electrolyte is well known to those skilled in the art.

Preferably, the above anode active material is one or more selected from the group consisting of graphite and a silicon carbon material.

The lithium-ion battery provided by the present invention has a charge cut-off voltage of greater than or equal to 4.3V.

During the charging process of the lithium-ion battery, the transition metal in the cathode active material such as Ni or Co may lose electrons and is oxidized into a high-valent ion. The high-valent Ni and Co ions have very high reactivity and can catalyze the decomposition reaction of the electrolyte on the surface of the cathode active material, and the decomposition reaction of the electrolyte may also cause the destruction of the surface structure of the cathode active material, and thereby cause metal ions to dissolve from the crystal structure of the cathode active material into the electrolyte, further catalyzing the decomposition reaction of the electrolyte.

The coating layer can be uniformly formed on the surface of the cathode active material by chemical vapor deposition (CVD) or atomic layer deposition (ALD), but such methods suffer from high energy consumption and it is difficult for them to realize industrial production. At present, industrial production employs a low-cost heat treatment method, by which a layer of inorganic metal oxide and/or metal fluoride particles can be coated on the surface of the cathode active material. However, the present inventors have found that the heat treatment technique cannot form a uniform, dense coating on the surface of the cathode active material. In addition, even if CVD or the like is employed to form a uniform coating layer on the cathode active material, the coating layer will easily crack in response to the expansion and contraction in volume of the cathode active material during charging and discharging, and the high-temperature cycling and the high-temperature storage of the battery still need to be further improved. The unsaturated phosphate ester compound represented by structural formula 1 contains an unsaturated bond, and can be polymerized in situ on the surface of the cathode active material under the catalysis of high-valent Ni or Co ion to form an organic polymer film having a certain elasticity, which can make up for the defect of metal oxide or metal fluoride coating. In addition, since the surface of the cathode material has been coated with a layer of inorganic particles, the number of the active points on the surface of the cathode material is reduced, and the unsaturated phosphate ester will only undergo in-situ polymerization at the active points that are not coated. Therefore, the surface of the cathode material is covered by the inorganic particles and the organic polymer film, and the impedance is smaller than that in the case of only being covered by the organic polymer film, which effectively suppresses the increase in the impedance, thus achieving high-temperature performance and low-temperature performance at the same time. Moreover, the reaction products of the unsaturated phosphate ester may have a certain interaction with the metal oxide or fluoride, so that the passivation film formed by the polymerization of the unsaturated phosphate ester compound can adhere more firmly to the surface of the cathode active material, thereby further suppressing the decomposition reaction of the electrolyte.

DETAILED DESCRIPTION

The present application will be further described in detail below by reference to particular examples and the accompanying drawings. The following examples are only intended to further illustrate the present application and are not to be construed as limiting the present application.

Example 1

The preparation method of the lithium-ion battery in this example comprised a cathode preparation step, an anode preparation step, an electrolyte preparation step, a separator preparation step, and a battery assembly step. Details of the preparation method are as follows:

Preparation of the cathode active material having a coating layer on the surface: LiOH, $NiCO_3$, $CoCO_3$ and $MnCO_3$ are mixed in a molar ratio of 1:0.5:0.2:0.3, and uniformly mixed to obtain a mixture. The mixture was heated at 195° C. for 12 hours in an oxygen-containing atmosphere to prepare the $LiNi_{0.5}Co_{0.2}Mn_{0.3}O_2$ material. The $LiNi_{0.5}Co_{0.2}Mn_{0.3}O_2$ material was mixed evenly with an Al(NO3)3 aqueous solution, and the resulting mixture was dried at 90° C. for 2 hours followed by heating at 400° C. for 8 hours in an oxygen-containing atmosphere to obtain the $LiNi_{0.5}Co_{0.2}Mn_{0.3}O_2/Al_2O_3$ material, wherein $LiNi_{0.5}Co_{0.2}Mn_{0.3}O_2:Al_2O_3=99:1$ (mass ratio).

Preparation of the cathode: the cathode active material $LiNi_{0.5}Co_{0.2}Mn_{0.3}O_2/Al_2O_3$ having a coating layer on the surface, conductive carbon black, and polyvinylidene fluoride as binder were mixed in a mass ratio of 96.8:2.0:1.2; the mixture was dispersed in N-methyl-2-pyrrolidone to obtain a cathode slurry; the cathode slurry was uniformly coated onto both sides of an aluminum foil; the aluminum foil was subjected to oven drying, calandering and vacuum drying, followed by welding of aluminum lead wires by an ultrasonic welder to obtain the cathode plate, the thickness of the plate being between 120-150 μm.

Preparation of the anode: graphite, conductive carbon black, and styrene butadiene rubber and carboxymethyl cellulose as binder were mixed in a mass ratio of 96:1:1.2: 1.8; the mixture was dispersed in deionized water to obtain an anode slurry; the anode slurry was coated onto both sides of a copper foil; the copper foil was subjected to oven drying, calandering and vacuum drying, followed by welding of nickel lead wires by an ultrasonic welder to obtain the anode plate, the thickness of the plate being between 120-150 μm.

Preparation of the electrolyte: ethylene carbonate, ethyl methyl carbonate and diethyl carbonate were mixed in a volume ratio of EC:EMC:DEC=3:3:4, and lithium hexafluorophosphate was added to the mixture at a concentration of 1.0 mol/L, followed by adding tripropargyl phosphate in an amount of 0.1 wt % based on the total weight of the electrolyte.

Preparation of the separator: a three-layer separator of polypropylene, polyethylene and polypropylene was used, the thickness being 20 μm.

Battery assembling: The three-layer separator having a thickness of 20 μm was placed between the cathode plate and the anode plate, and the resulting sandwich structure composed of the cathode plate, the anode plate and the separator was wound. The wound structure was flattened and placed into an aluminum foil packing bag, and baked at 85° C. under vacuum for 24 hours to obtain a battery core, which was to be injected with electrolyte. Then, the battery core was injected with the electrolyte prepared, and was vacuum-packed and allowed to stand for 24 hours.

Then, conventional formation at initial charging was conducted according to the following steps: 0.05 C constant current charging for 180 min, 0.1 C constant current charging to 3.95V, vacuum packing again and standing at 45° C. for 48 h, then further, 0.2 C constant current charging to 4.35V, with the cut-off current being 0.01 C, followed by 0.2 C constant current discharging to 3.0V, thus obtaining the lithium-ion battery in this example.

Examples 2-25

Examples 2 to 25 were the same as Example 1 except that the particular compounds for the coating layer and the unsaturated phosphate ester compound as well as their amounts were different. The particular compounds for the various examples and their amounts are shown in Table 1, Table 3 and Table 5, wherein the amounts of the various compounds were calculated as the percentage of the total weight of the non-ionic electrolyte for lithium-ion battery.

In addition, 20 comparative examples were designed in the present application, i.e., Comparative Examples 1-20. Similarly, these 20 comparative examples were the same as Example 1 or other examples except that the particular compounds added and their amounts were different. The particular compounds for the various comparative examples and their amounts are shown in Table 1 and Table 3, wherein the amounts of the various compounds were likewise calculated as the percentage of the total weight of the non-ionic electrolyte for lithium-ion battery.

TABLE 1

|  | Cathode active substance | Coating layer and amount | Anode active substance | Structural formula I and amount |
| --- | --- | --- | --- | --- |
| Example 1 | $LiNi_{0.5}Co_{0.2}Mn_{0.3}O_2$ | $Al_2O_3$: 1% | Artificial graphite | Tripropargyl phosphate: 1% |
| Example 2 | $LiNi_{0.5}Co_{0.2}Mn_{0.3}O_2$ | MgO: 1% | Artificial graphite | Tripropargyl phosphate: 1% |
| Example 3 | $LiNi_{0.5}Co_{0.2}Mn_{0.3}O_2$ | $ZrO_2$: 1% | Artificial graphite | Tripropargyl phosphate: 1% |
| Example 4 | $LiNi_{0.5}Co_{0.2}Mn_{0.3}O_2$ | ZnO: 1% | Artificial graphite | Tripropargyl phosphate: 1% |
| Example 5 | $LiNi_{0.5}Co_{0.2}Mn_{0.3}O_2$ | $AlF_3$: 1% | Artificial graphite | Tripropargyl phosphate: 1% |
| Example 6 | $LiNi_{0.5}Co_{0.2}Mn_{0.3}O_2$ | $Al_2O_3$: 0.5% | Artificial graphite | Tripropargyl phosphate: 1% |
| Example 7 | $LiNi_{0.5}Co_{0.2}Mn_{0.3}O_2$ | $Al_2O_3$: 2% | Artificial graphite | Tripropargyl phosphate: 1% |
| Example 8 | $LiNi_{0.5}Co_{0.2}Mn_{0.3}O_2$ | $Al_2O_3$: 3% | Artificial graphite | Tripropargyl phosphate: 1% |
| Example 9 | $LiNi_{0.5}Co_{0.2}Mn_{0.3}O_2$ | $ZrO_2$: 1% | Artificial graphite | Dipropargylethyl phosphate: 1% |
| Example 10 | $LiNi_{0.5}Co_{0.2}Mn_{0.3}O_2$ | $ZrO_2$: 1% | Artificial graphite | Hexafluoroisopropyldipropargyl phosphate: 1% |
| Example 11 | $LiNi_{0.5}Co_{0.2}Mn_{0.3}O_2$ | $ZrO_2$: 1% | Artificial graphite | Hexafluoroisopropyldipropargyl phosphate |
| Example 12 | $LiNi_{0.5}Co_{0.2}Mn_{0.3}O_2$ | MgO: 1% | Artificial graphite | Tripropargyl phosphate: 0.1% |
| Example 13 | $LiNi_{0.5}Co_{0.2}Mn_{0.3}O_2$ | MgO: 1% | Artificial graphite | Tripropargyl phosphate: 0.5% |
| Example 14 | $LiNi_{0.5}Co_{0.2}Mn_{0.3}O_2$ | MgO: 1% | Artificial graphite | Tripropargyl phosphate: 1% |
| Example 15 | $LiNi_{0.6}Co_{0.2}Mn_{0.2}O_2$ | MgO: 1% | Artificial graphite | Tripropargyl phosphate: 2% |
| Example 16 | $LiNi_{0.6}Co_{0.2}Mn_{0.2}O_2$ | $ZrO_2$: 1% | Artificial graphite | Tripropargyl phosphate: 1% |
| Example 17 | $LiNi_{0.8}Co_{0.1}Mn_{0.1}O_2$ | $Al_2O_3$: 1% | Artificial graphite | Tripropargyl phosphate: 1% |
| Example 18 | $LiNi_{0.8}Co_{0.1}Mn_{0.1}O_2$ | ZnO: 1% | Artificial graphite | Tripropargyl phosphate: 1% |
| Example 19 | $LiNi_{0.8}Co_{0.2}O_2$ | $Al_2O_3$: 1% | Artificial graphite | Tripropargyl phosphate: 1% |
| Example 20 | $LiNi_{0.8}Co_{0.15}Al_{0.05}O_2$ | $Al_2O_3$: 1% | Artificial graphite | Tripropargyl phosphate: 1% |
| Example 21 | $LiNi_{0.8}Co_{0.15}Al_{0.05}O_2$ | ZnO: 1% | Artificial graphite | Tripropargyl phosphate: 1% |
| Example 22 | $LiCoO_2$ | $Al_2O_3$: 1% | Artificial graphite | Tripropargyl phosphate: 1% |
| Example 23 | $LiCoO_2$ | MgO: 1% | Artificial graphite | Tripropargyl phosphate: 1% |
| Example 24 | $LiCoO_2$ | $ZrO_2$: 1% | Artificial graphite | Tripropargyl phosphate: 1% |
| Example 25 | $LiCoO_2$ | $AlF_3$: 1% | Artificial graphite | Tripropargyl phosphate: 1% |

TABLE 1-continued

|  | Cathode active substance | Coating layer and amount | Anode active substance | Structural formula I and amount |
|---|---|---|---|---|
| Comparative Example 1 | $LiNi_{0.5}Co_{0.2}Mn_{0.3}O_2$ |  | Artificial graphite | Tripropargyl phosphate: 1% |
| Comparative Example 2 | $LiNi_{0.6}Co_{0.2}Mn_{0.2}O_2$ |  | Artificial graphite | Tripropargyl phosphate: 1% |
| Comparative Example 3 | $LiNi_{0.8}Co_{0.1}Mn_{0.1}O_2$ |  | Artificial graphite | Tripropargyl phosphate: 1% |
| Comparative Example 4 | $LiNi_{0.8}Co_{0.15}Al_{0.05}O_2$ |  | Artificial graphite | Tripropargyl phosphate: 1% |
| Comparative Example 5 | $LiCoO_2$ |  | Artificial graphite | Tripropargyl phosphate: 1% |
| Comparative Example 6 | $LiNi_{0.5}Co_{0.2}Mn_{0.3}O_2$ | $Al_2O_3$: 1% | Artificial graphite |  |
| Comparative Example 7 | $LiNi_{0.6}Co_{0.2}Mn_{0.2}O_2$ | MgO: 1% | Artificial graphite |  |
| Comparative Example 8 | $LiNi_{0.8}Co_{0.1}Mn_{0.1}O_2$ | $Al_2O_3$: 1% | Artificial graphite |  |
| Comparative Example 9 | $LiNi_{0.8}Co_{0.15}Al_{0.05}O_2$ | ZnO: 1% | Artificial graphite |  |
| Comparative Example 10 | $LiCoO_2$ | $ZrO_2$: 1% | Artificial graphite |  |

The lithium-ion batteries prepared in the above Examples and Comparative Examples were subjected to the following tests.

(1) High-temperature cycling performance test: subjecting, at 45° C., the formed battery to 1 C constant current and constant voltage charging to 4.35V, followed by 1 C constant current discharging to 3.0V. After 500 cycles of charging/discharging, the capacity retention rate after the 500$^{th}$ cycle was calculated to evaluate the high-temperature cycling performance. The formula for calculation is as follows:

Capacity retention rate after the 500$^{th}$ cycle (%)= (discharge capacity at the 500$^{th}$ cycle/discharge capacity at the 1$^{st}$ cycle)×100%.

(2) High-temperature storage performance: subjecting, at a normal temperature, the formed battery to 1 C constant current constant voltage charging to 4.35 V, at which time the initial discharge capacity of the battery was measured, followed by storage of the battery at 60° C. for 30 days, and followed by 1 C discharging to 3.0 V, at which time the retention capacity and the recovery capacity of the battery were measured. The formulas for calculation are as follows:

Battery capacity retention rate (%)=retention capacity/initial capacity×100%;

Battery capacity recovery rate (%)=recovery capacity/initial capacity×100%;

Thickness expansion rate (%)=expansion thickness/initial thickness×100%.

(3) Low-temperature discharge performance test subjecting, at 25° C., the formed battery to 1 C constant current and constant voltage charging to 4.35V, followed by constant voltage charging until the current dropped to 0.01 C, followed by 1 C constant current discharging to 3.0V and recording the normal-temperature discharging capacity, followed by 1 C constant current charging to 4.35V and then constant voltage charging until the current dropped to 0.01 C, followed by allowing the battery to stand in a −20° C. environment for 12 hours, and followed by 0.2 C constant current discharging to 3.0V and recording the discharging capacity at −20° C.

Low-temperature discharging efficiency at −20° C.=0.2 C discharging capacity(−20° C.)/1C discharging capacity(25° C.)×100%.

The relevant test results are shown in Table 2 and Table 4.

TABLE 2

|  | Capacity retention rate after 1 C cycling for 500 cycles at 45° C. | 60° C. high-temperature storage for 30 days | | | 0.2 C discharge efficiency at −20° C. |
|---|---|---|---|---|---|
|  |  | Capacity retention rate | Capacity recovery rate | Thickness expansion rate |  |
| Example 1 | 86.4% | 87.5% | 92.3% | 12.5% | 70.2% |
| Example 2 | 87.2% | 87.9% | 93.2% | 11.4% | 71.5% |
| Example 3 | 86.5% | 87.7% | 91.9% | 12.1% | 72.4% |
| Example 4 | 88.4% | 88.1% | 93.5% | 11.2% | 71.6% |
| Example 5 | 85.5% | 86.4% | 91.4% | 12.8% | 70.1% |
| Example 6 | 75.3% | 75.4% | 80.5% | 17.7% | 64.3% |
| Example 7 | 88.5% | 89.2% | 94.7% | 10.5% | 72.4% |
| Example 8 | 89.8% | 91.2% | 95.8% | 7.5% | 73.5% |
| Example 9 | 84.1% | 85.2% | 90.2% | 14.4% | 70.5% |
| Example 10 | 82.5% | 84.1% | 88.5% | 15.8% | 74.2% |
| Example 11 | 82.1% | 84.8% | 89.1% | 15.1% | 74.5% |
| Example 12 | 60.2% | 63.5% | 68.8% | 38.4% | 74.6% |
| Example 13 | 80.9% | 83.1% | 88.2% | 22.5% | 71.4% |
| Example 14 | 84.1% | 85.5% | 90.5% | 14.7% | 69.2% |
| Example 15 | 88.1% | 88.6% | 93.5% | 8.5% | 64.2% |
| Example 16 | 84.8% | 85.1% | 90.7% | 15.8% | 72.3% |
| Example 17 | 82.5% | 83.4% | 88.9% | 18.7% | 68.5% |
| Example 18 | 81.9% | 82.8% | 87.4% | 19.5% | 69.4% |
| Example 19 | 80.5% | 83.7% | 90.9% | 21.7% | 71.4% |
| Example 20 | 82.9% | 84.7% | 89.4% | 17.5% | 68.4% |
| Example 21 | 83.5% | 85.5% | 90.4% | 18.8% | 70.1% |
| Example 22 | 88.6% | 88.7% | 93.9% | 8.2% | 73.1% |
| Example 23 | 87.4% | 87.6% | 93.4% | 8.9% | 72.1% |

TABLE 2-continued

|  | Capacity retention rate after 1 C cycling for 500 cycles at 45° C. | 60° C. high-temperature storage for 30 days | | | 0.2 C discharge efficiency at −20° C. |
|---|---|---|---|---|---|
|  |  | Capacity retention rate | Capacity recovery rate | Thickness expansion rate |  |
| Example 24 | 89.3% | 88.5% | 94.4% | 9.1% | 74.2% |
| Example 25 | 87.8% | 87.5% | 92.3% | 8.5% | 71.5% |
| Comparative Example 1 | 70.3% | 70.4% | 75.5% | 22.7% | 47.5% |
| Comparative Example 2 | 68.7% | 71.7% | 76.4% | 23.4% | 46.2% |
| Comparative Example 3 | 67.4% | 66.7% | 71.5% | 27.4% | 48.3% |
| Comparative Example 4 | 72.3% | 71.4% | 76.1% | 20.8% | 45.8% |
| Comparative Example 5 | 74.4% | 70.9% | 75.4% | 18.5.% | 48% |
| Comparative Example 6 | 60.1% | 59.3% | 65.7% | 41.5% | 74.1% |
| Comparative Example 7 | 57.5% | 60.2% | 65.6% | 44.7% | 76.4% |
| Comparative Example 8 | 57.6% | 57.4% | 62.5% | 50.7% | 72.1% |
| Comparative Example 9 | 62.5% | 61.7% | 66.3% | 32.8% | 73.5% |
| Comparative Example 10 | 64.8% | 60.8% | 66.7% | 33.8% | 78.1% |

TABLE 3

|  | Cathode active substance | Coating layer and amount | Anode active substance | Structural formula I and amount |
|---|---|---|---|---|
| Example 26 | $LiNi_{0.5}Co_{0.2}Mn_{0.3}O_2$ | ZnO: 1% | Silicon carbon | Tripropargyl phosphate: 1% |
| Example 27 | $LiNi_{0.6}Co_{0.2}Mn_{0.2}O_2$ | MgO: 1% | Silicon carbon | Tripropargyl phosphate: 1% |
| Example 28 | $LiNi_{0.8}Co_{0.1}Mn_{0.1}O_2$ | $Al_2O_3$: 1% | Silicon carbon | Tripropargyl phosphate: 1% |
| Example 29 | $LiNi_{0.8}Co_{0.15}Al_{0.05}O_2$ | ZnO: 1% | Silicon carbon | Tripropargyl phosphate: 1% |
| Example 30 | $LiCoO_2$ | $ZrO_2$: 1% | Silicon carbon | Tripropargyl phosphate: 1% |
| Comparative Example 11 | $LiNi_{0.5}Co_{0.2}Mn_{0.3}O_2$ | ZnO: 1% | Silicon carbon |  |
| Comparative Example 12 | $LiNi_{0.6}Co_{0.2}Mn_{0.2}O_2$ | MgO: 1% | Silicon carbon |  |
| Comparative Example 13 | $LiNi_{0.8}Co_{0.1}Mn_{0.1}O_2$ | $Al_2O_3$: 1% | Silicon carbon |  |
| Comparative Example 14 | $LiNi_{0.8}Co_{0.15}Al_{0.05}O_2$ | ZnO: 1% | Silicon carbon |  |
| Comparative Example 15 | $LiCoO_2$ | $ZrO_2$: 1% | Silicon carbon |  |
| Comparative Example 16 | $LiNi_{0.5}Co_{0.2}Mn_{0.3}O_2$ |  | Silicon carbon | Tripropargyl phosphate: 1% |
| Comparative Example 17 | $LiNi_{0.6}Co_{0.2}Mn_{0.2}O_2$ |  | Silicon carbon | Tripropargyl phosphate: 1% |
| Comparative Example 18 | $LiNi_{0.8}Co_{0.1}Mn_{0.1}O_2$ |  | Silicon carbon | Tripropargyl phosphate: 1% |
| Comparative Example 19 | $LiNi_{0.8}Co_{0.15}Al_{0.05}O_2$ |  | Silicon carbon | Tripropargyl phosphate: 1% |
| Comparative Example 20 | $LiCoO_2$ |  | Silicon carbon | Tripropargyl phosphate: 1% |

TABLE 4

|  | Capacity retention rate after 1 C cycling for 500 cycles at 45° C. | 60° C. high-temperature storage for 30 days | | | 0.2 C discharge efficiency at −20° C. |
|---|---|---|---|---|---|
|  |  | Capacity retention rate | Capacity recovery rate | Thickness expansion rate |  |
| Example 26 | 82.3% | 83.2% | 88.6% | 17.7% | 70.5% |
| Example 27 | 80.4% | 80.3% | 85.7% | 22.6% | 71.2% |
| Example 28 | 78.1% | 78.7% | 84.1% | 25.5% | 70.8% |
| Example 29 | 79.4% | 80.8% | 85.4% | 27.7% | 70.4% |
| Example 30 | 83.5% | 83.9% | 89.4% | 14.3% | 74.3% |
| Comparative Example 11 | 59.1% | 55.4% | 60.6% | 30.7% | 77.2% |
| Comparative Example 12 | 54.3% | 50.6% | 60.8% | 36.4% | 78.1% |
| Comparative Example 13 | 52.8% | 47.9% | 51.6% | 38.7% | 76.1% |
| Comparative Example 14 | 53.7% | 47.8% | 52.8% | 40.9% | 75.2% |
| Comparative Example 15 | 58.5% | 54.5% | 60.9% | 21.5% | 80.1% |
| Comparative Example 16 | 67.7% | 63.3% | 68.7% | 24.4% | 51.6% |
| Comparative Example 17 | 65.5% | 60.5% | 85.7% | 29.5% | 52.4% |
| Comparative Example 18 | 62.6% | 57.8% | 62.6% | 32.5% | 52.1% |
| Comparative Example 19 | 64.7% | 60.7% | 85.7% | 34.8% | 50.1% |
| Comnarative Example 20 | 69.8% | 64.2% | 70.6% | 21.5% | 52.5% |

It can be seen from the test results of the Examples and Comparative Examples shown in Table 2 and Table 4 above that for either silicon carbon anode or artificial graphite anode, and for various cathode material system, the coating layer and the unsaturated phosphate ester worked together such that the high-temperature cycling performance and high-temperature storage performance of the batteries were significantly increased. Moreover, compared with the examples where the unsaturated phosphate ester was added alone or the coating layer was used alone, the present invention, by virtue of the synergy of the coating layer and the unsaturated phosphate ester, allowed the high-temperature cycling performance and high-temperature storage performance of the batteries to be further enhanced at the same time without compromising the low-temperature discharge performance.

The above is a further detailed description of the present application in conjunction with particular embodiments, and the specific implementation of the present application is not to be construed as limiting to such description. It will be apparent to those skilled in the art that several simple derivations and substitutions can be made without departing from the concept of the present application and such derivations and substitutions shall be deemed to fall within the scope of protection of the present application.

The invention claimed is:

1. A lithium-ion battery, comprising a battery case, and a cathode, an anode and a non-aqueous electrolyte inside the battery case;
   the cathode comprising a cathode active material and a coating layer coated on a surface of the cathode active material; the cathode active material having at least one of the component represented by general formula 1 or general formula 2, $Li_xNi_yM_{1-y}O_2$, general formula 1:

wherein $0.5 \leq x \leq 1.2$, $0.5 \leq y \leq 1$, and M is at least one selected from the group consisting of Co, Mn, Al, Ti, Fe, Zn, Zr, and Cr;

$Li_kCo_zL_{1-z}O_2$, general formula 2:

wherein $0.5 \leq k \leq 1.2$, $0.5 < z \leq 1$, L is at least one selected from the group consisting of Ni, Mn, Al, Ti, Fe, Zn, Zr, and Cr;
   the coating layer is a metal oxide and/or a metal fluoride;
   the anode includes an anode active material selected from at least one of graphite or a silicon-containing carbon material;
   the non-aqueous electrolyte contains at least one of the unsaturated phosphate ester compounds represented by structural formula 1,

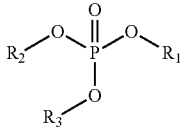
   structural formula 1 wherein $R_1$, $R_2$ and $R_3$ are each independently selected from a saturated hydrocarbon group, an unsaturated hydrocarbon group or a halogenated hydrocarbon group having 1 to 5 carbon atoms, and at least one of $R_1$, $R_2$ and $R_3$ is an unsaturated hydrocarbon group.

2. The lithium-ion battery according to claim 1, wherein in general formula 1, $0.8 \leq x \leq 1.1$, and $0.8 \leq y \leq 1$; and in general formula 2, $0.8 \leq z \leq 1$.

3. The lithium-ion battery according to claim 1, wherein the cathode active material represented by general formula 1 is one selected from the group consisting of $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$, $LiNi_{0.8}Co_{0.2}O_2$, and $LiNi_{0.8}Co_{0.15}Al_{0.05}O_2$;
   the cathode active material represented by general formula 2 is selected from $LiCoO_2$.

4. The lithium-ion battery according to claim 1, wherein the material of the coating layer is an oxide or fluoride of at least one of Zn, Mg, Al, Zr, Cr, Ti, Ag, Nb, Y, Sr, W, Mo, Pb, Cd, Ca, Ba, or Sn.

5. The lithium-ion battery according to claim 4, wherein the material of the coating layer is at least one selected from the group consisting of ZnO, MgO, $Al_2O_3$, $ZrO_2$, $Cr_2O_3$, $AlF_3$, or $TiO_2$.

6. The lithium-ion battery according to claim 1, wherein the content of the coating layer is 0.1 to 5% based on the total weight of the cathode active material and the coating layer.

7. The lithium-ion battery according to claim 1, wherein in structural formula 1, the saturated hydrocarbon group is one selected from the group consisting of methyl, ethyl, propyl, isopropyl, or butyl;
   the unsaturated hydrocarbon group is one selected from the group consisting of vinyl, allyl, 3-butenyl, isobutenyl, 4-pentenyl, ethynyl, propargyl, 3-butynyl, or 1-methyl-2-propynyl; and
   the halogenated hydrocarbon group is one selected from the group consisting of monofluoromethyl, difluoromethyl, trifluoromethyl, 2,2,2-trifluoroethyl, 2,2-difluoroethyl, 2,2,2-trifluoroethyl, 3,3-difluoropropyl, 3,3,3-trifluoropropyl, or hexafluoroisopropyl.

8. The lithium-ion battery according to claim 7, wherein the unsaturated phosphate ester compound is one or more selected from the group consisting of tripropargyl phosphate, dipropargyl methyl phosphate, dipropargyl ethyl phosphate, dipropargyl propyl phosphate, dipropargyl trifluoromethyl phosphate, dipropargyl 2,2,2-trifluoroethyl phosphate, dipropargyl 3,3,3-trifluoropropyl phosphate, dipropargyl hexafluoroisopropyl phosphate, triallyl phosphate, diallyl methyl phosphate, diallyl ethyl phosphate, diallylpropyl phosphate, diallyl trifluoromethyl phosphate, diallyl 2,2,2-trifluoroethyl phosphate, diallyl 3,3,3-trifluoropropyl phosphate, or diallyl hexafluoroisopropyl phosphate.

9. The lithium-ion battery according to claim 7, wherein in the non-aqueous electrolyte, the content of the unsaturated phosphate ester compound is from 0.1% to 5%.

10. The lithium-ion battery according to claim 1, wherein the lithium-ion battery has a charge cut-off voltage of greater than or equal to 4.3V.

* * * * *